United States Patent
Söhner

(10) Patent No.: US 11,314,879 B2
(45) Date of Patent: Apr. 26, 2022

(54) METHOD FOR GENERATING AND STORING A DIGITAL COPY OF A MOTOR VEHICLE

(71) Applicant: Dr. Ing. h.c. F. Porsche Aktiengesellschaft, Stuttgart (DE)

(72) Inventor: Sebastian Söhner, Karlsruhe (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 46 days.

(21) Appl. No.: 16/798,635

(22) Filed: Feb. 24, 2020

(65) Prior Publication Data
US 2020/0279049 A1 Sep. 3, 2020

(30) Foreign Application Priority Data
Feb. 28, 2019 (DE) .......................... 102019105147.9

(51) Int. Cl.
*G06F 21/62* (2013.01)
*H04L 9/08* (2006.01)

(52) U.S. Cl.
CPC ........ *G06F 21/6209* (2013.01); *H04L 9/0894* (2013.01); *H04L 2209/38* (2013.01); *H04L 2209/84* (2013.01)

(58) Field of Classification Search
CPC ... G06F 21/6209; G06F 21/64; H04L 9/0894; H04L 2209/84; H04L 2209/38; H04L 9/0861; H04L 9/3239
See application file for complete search history.

(56) References Cited

U.S. PATENT DOCUMENTS

| | | | |
|---|---|---|---|
| 9,196,099 B2 | 11/2015 | Grill et al. | |
| 10,666,767 B1* | 5/2020 | Floyd | H04W 12/06 |
| 2008/0232595 A1* | 9/2008 | Pietrowicz | G06Q 20/3829 380/277 |
| 2010/0040234 A1* | 2/2010 | Alrabady | H04L 9/321 380/278 |
| 2014/0016781 A1* | 1/2014 | Geiger | H04L 9/0816 380/277 |
| 2014/0309842 A1* | 10/2014 | Jefferies | G07B 15/00 701/31.5 |
| 2018/0018723 A1* | 1/2018 | Nagla | H04L 63/08 |
| 2018/0091596 A1* | 3/2018 | Alvarez | H04L 67/12 |
| 2019/0372778 A1* | 12/2019 | Palaniappan | H04L 9/3231 |
| 2019/0384587 A1* | 12/2019 | Rao | H04L 9/3239 |
| 2020/0028691 A1* | 1/2020 | Rao | G06F 8/658 |
| 2020/0036530 A1* | 1/2020 | Lampkins | G06F 21/645 |
| 2020/0050774 A1* | 2/2020 | Unagami | H04L 9/3247 |
| 2020/0073651 A1* | 3/2020 | Rodriguez Bravo | H04L 63/123 |
| 2020/0081699 A1* | 3/2020 | Majed | G06F 8/65 |
| 2020/0184739 A1* | 6/2020 | Nathan | G06Q 10/20 |

(Continued)

FOREIGN PATENT DOCUMENTS

| | | |
|---|---|---|
| DE | 102007058163 A1 | 4/2009 |
| DE | 102016007472 A1 | 12/2017 |

*Primary Examiner* — Taghi T Arani
*Assistant Examiner* — Blake I Narramore
(74) *Attorney, Agent, or Firm* — RatnerPrestia

(57) ABSTRACT

A method for generating and storing a digital copy of a motor vehicle includes: (a) generating a private key; (b) storing the private key in a data memory of the motor vehicle; (c) generating the digital copy of the motor vehicle; and (d) storing the digital copy of the motor vehicle in a blockchain by way of the private key.

7 Claims, 2 Drawing Sheets

(56) References Cited

U.S. PATENT DOCUMENTS

2020/0193363 A1* 6/2020 Jones .................... G06Q 10/20
2020/0213329 A1* 7/2020 Simons ................ H04L 9/3226

* cited by examiner

METHOD FOR GENERATING AND STORING A DIGITAL COPY OF A MOTOR VEHICLE

CROSS-REFERENCE TO RELATED APPLICATION

This application claims priority to German Patent Application No. 102019105147.9, filed Feb. 28, 2019, the content of such application being incorporated by reference herein in its entirety.

FIELD OF THE INVENTION

The invention relates to a method for generating and storing a digital copy of a motor vehicle.

BACKGROUND OF THE INVENTION

The prior art discloses uniquely identifying vehicles using an assignable vehicle identification number (or also VIN for short). In this case, each vehicle that is produced receives a new vehicle identification number. A vehicle identification number therefore occurs just once and represents the vehicle.

It is also known to create a digital copy of an actually built motor vehicle that is able to be viewed for example by way of computer graphics. One problem here is that the copy is able to be replicated as desired. Several different people may accordingly possess the digital copy at the same time and each replicate it further.

SUMMARY OF THE INVENTION

Described herein is a method for generating and storing a digital copy of a motor vehicle that prevents replication of the digital copy.

The method according to the invention comprises the following method steps:
  generating a private key;
  storing the private key in a data memory of the motor vehicle;
  generating the digital copy of the motor vehicle; and
  storing the digital copy of the motor vehicle in a blockchain by way of the private key.

This configuration makes it possible to prevent replication of the digital copy. The method according to the invention makes it possible to allow the digital copy to be displayed to a user only when said user is in possession of the motor vehicle. Access to the digital copy is then thus no longer possible when the motor vehicle is sold by the user. By virtue of the configuration according to the invention, vehicle collections are able to be digitized, wherein the authenticity of the motor vehicle models that are part of the vehicle collection is verified by the method according to the invention.

A blockchain within the meaning of the invention is a continually expandable list of datasets, called blocks, that are chained to one another by way of cryptographic methods. Each block in this case typically contains a cryptographically secure hash (spread value) of the preceding block, a timestamp and transaction data. The blockchain may be stored in a decentralized manner, for example in a cloud.

Such a blockchain is also used for example to manage an accounting system in a decentralized manner, for which accounting system the respectively correct state has to be documented as a large number of participants are involved in the accounting. What is decisive in the case of the blockchain is that subsequent transactions build on earlier transactions and confirm these as correct by proving the knowledge of the earlier transactions. It is thereby made impossible to manipulate or to eradicate the existence or content of earlier transactions without at the same time likewise destroying all subsequent transactions. Other participants in the decentralized accounting who also have knowledge of the subsequent transactions would recognize a manipulated copy of the blockchain due to the fact that it contains inconsistencies in the calculations.

New blocks are created via a consensus method and then appended to the blockchain. By virtue of storing data in the blockchain in storage operations that build on one another, these data are not able to be retrospectively amended without damaging the integrity of the overall system. It is thereby made considerably more difficult to manipulate data. The decentralized consensus mechanism replaces the requirement for a trusted third-party entity in order to confirm the integrity of transactions.

The blockchain is thus a chained sequence of data blocks that continues to be written over time. The blockchain is not stored centrally, but rather managed as a distributed register. All of the parties involved store a dedicated copy and continue to write this. Mapping methods ensure that the blockchain is not able to be retrospectively amended. The chain of the blocks is thus unchangeable, counterfeit-proof and manipulation-proof.

The data stored in the blockchain are accessible to all parties involved. They are however not necessarily legible to everyone, since content may be stored in encrypted form. The blockchain thus allows a flexible configuration of the confidentiality level. By using digital signatures, it is possible to store information in the blockchain that proves, in a counterfeit-proof manner, that participants have stored particular data in an incalculable manner.

The private key is a private key of an asymmetric cryptographic system. The private key in this case serves as a digital signature when editing the blockchain. The signature may in this case be verified by way of a public key.

The data memory of the motor vehicle may be a data memory that is not accessible to third parties.

In one preferred configuration, the method furthermore comprises the following further method steps:
  generating a vehicle identification number; and
  assigning the vehicle identification number to the motor vehicle and to the digital copy.

The vehicle is able to be uniquely identified using the vehicle identification number. A vehicle identification number occurs just once and represents the vehicle. The digital copy may thus also be uniquely assigned to a particular motor vehicle.

A memory address is preferably generated on the basis of the vehicle identification number and the blockchain is stored in a memory space that is referenced by the memory address.

By virtue of this configuration, an outsider is able to recognize, by way of the vehicle identification number, which vehicle and therefore which value lies at the storage address of the blockchain.

In one preferred configuration, the private key is generated at a time during the manufacture of the motor vehicle.

The private key is preferably generated on the basis of motor vehicle data present at the time. These motor vehicle data may be for example the time in the production process, dataset versions of the various controllers installed in the motor vehicle, the vehicle identification number, the times at which the control software is installed on the controllers and/or be the locations where the control software is installed on the controllers. A situation whereby two identical private keys are generated for two different vehicles is thereby able to be excluded.

In one preferred configuration, direct reading of the private key by a user of the motor vehicle is prevented.

The method preferably furthermore comprises the following further method steps:
producing a data connection between the motor vehicle and a viewing means;
loading the digital copy from the blockchain into the data memory of the motor vehicle using the private key;
transferring the digital copy from the data memory of the motor vehicle to a further data memory of the viewing means by way of the data connection; and
viewing the digital copy stored in the further data memory on the viewing means.

As an alternative, the method may comprise the following further method steps:
loading the permission to copy the digital copy from the blockchain into any desired data memory, in particular into a data memory of a viewing means, using the private key.

The method preferably comprises the following further method steps:
producing a data connection between the blockchain and the viewing means;
transferring the digital copy from the blockchain to the data memory of the viewing means by way of the data connection and using the permission; and
viewing the copy stored in the data memory of the viewing means on the viewing means.

In this case, the motor vehicle may function just as an inaccessible private key.

Displaying the digital copy may preferably be possible only for people who are in possession of the motor vehicle.

Such a viewing means may be for example a mobile telephone, a tablet, an AR (augmented reality) device and/or a VR (virtual reality) device. The data connection may be for example a Bluetooth connection or a WLAN connection.

BRIEF DESCRIPTION OF THE DRAWING FIGURES

DETAILED DESCRIPTION OF THE INVENTION

Details and further advantages of the method according to the invention are explained with reference to the exemplary embodiment described below.

Figure 1:
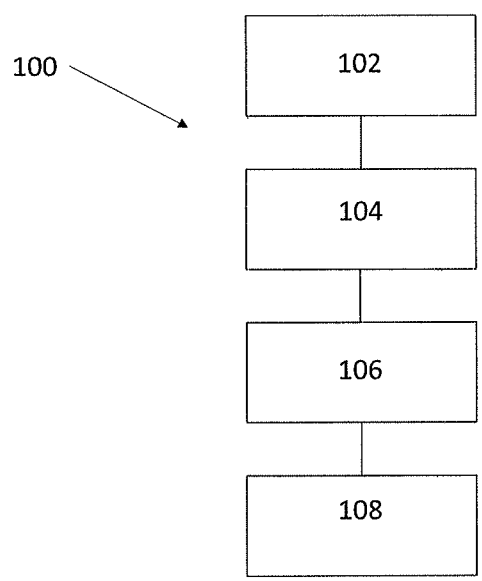
FIG. 1 depicts a schematic of a method for generating and storing a digital copy of a motor vehicle.
Figure 2:
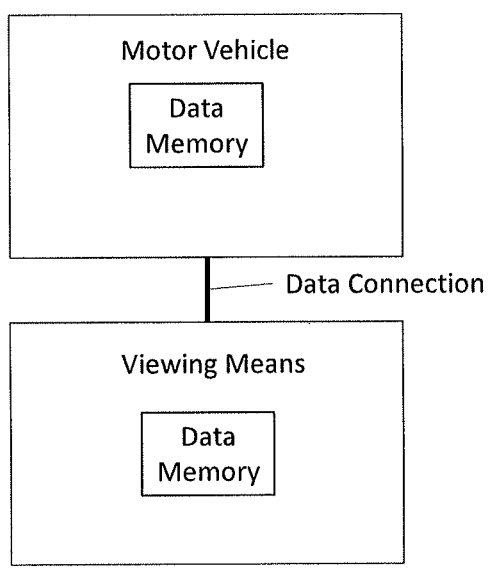
FIG. 2 depicts a schematic view of a motor vehicle connected to a viewing means.

With reference to FIGS. 1 and 2, described herein is a method 100 for generating and storing a digital copy of a motor vehicle. The method according to the application in this case comprises the following method steps:
Step 102—generating a private key;
Step 104—storing the private key in a data memory of the motor vehicle;
Step 106—generating the digital copy of the motor vehicle; and
Step 108—storing the digital copy of the motor vehicle in a blockchain by way of the private key.

The data memory of the motor vehicle may be a data memory that is not accessible to third parties.

This configuration makes it possible to prevent replication of the digital copy. The method according to the invention makes it possible to allow the digital copy to be displayed to a user only when said user is in possession of the motor vehicle. Access to the digital copy is then thus no longer possible when the motor vehicle is sold by the user. By virtue of the configuration according to the invention, vehicle collections are able to be digitized, wherein the authenticity of the motor vehicle models that are part of the vehicle collection is verified by the method according to the invention.

The method may comprise the following further method steps:
generating a vehicle identification number; and
assigning the vehicle identification number to the motor vehicle and to the digital copy.

The vehicle identification number serves to uniquely identify a motor vehicle, since each motor vehicle that is produced receives a different vehicle identification number.

A memory address may be generated on the basis of the vehicle identification number and the blockchain may be stored in a memory space that is referenced by the memory address.

The private key may be generated at a time during the manufacture of the motor vehicle. The private key is preferably generated up to a time in the production process at which the motor vehicle is sold.

The private key may be generated on the basis of motor vehicle data present at the time. These may in particular be motor vehicle data that are present up to the time in the production process at which the motor vehicle is sold.

These motor vehicle data may be for example the time in the production process, dataset versions of the various controllers installed in the motor vehicle, the vehicle identification number, the times at which the control software is installed on the controllers and/or be the locations where the control software is installed on the controllers. A situation whereby two identical private keys are generated for two different vehicles is thereby able to be excluded.

Direct reading of the private key by a user of the motor vehicle may be prevented in the method according to the application.

The method according to the application may furthermore comprise the following further method steps:
producing a data connection between the motor vehicle and a viewing means;
loading the digital copy from the blockchain into the data memory of the motor vehicle using the private key;
transferring the digital copy from the data memory of the motor vehicle to a further data memory of the viewing means by way of the data connection; and
viewing the digital copy stored in the further data memory on the viewing means.

As an alternative, the method may comprise the following further method steps:
loading the permission to copy the digital copy from the blockchain into any desired data memory, in particular into a data memory of a viewing means, using the private key.

The method preferably comprises the following further method steps:
producing a data connection between the blockchain and the viewing means;

transferring the digital copy from the blockchain to the data memory of the viewing means by way of the data connection and using the permission; and viewing the copy stored in the data memory of the viewing means on the viewing means.

In this case, the motor vehicle may function just as an inaccessible private key.

Displaying the digital copy may preferably be possible only for people who are in possession of the motor vehicle.

Such a viewing means may be for example a mobile telephone, a tablet, an AR (augmented reality) device and/or a VR (virtual reality) device. The data connection may be for example a Bluetooth connection or a WLAN connection.

By virtue of the method according to the application, a digital copy of the vehicle is able to be generated during the production process. This digital copy is stored in any desired blockchain, wherein the vehicle identification number represents a memory address in which the digital copy of the vehicle is stored. The private key for accessing the digital copy is generated by the production processes. Contributors to the private key may in this case be the time in the production process, dataset versions of the various controllers, the vehicle identification number, the times at which the control software is installed on the controllers and/or be the locations where the control software is installed on the controllers. A situation whereby two identical private keys arise for two different motor vehicles is thus able to be excluded. The private key is stored in the motor vehicle, that is to say in a data memory of the motor vehicle, but is not able to be read or forwarded by the user of the motor vehicle. The information for reconstructing the private key remains with the motor vehicle manufacturer in order to be able to reproduce the data in the vehicle in the event that the private key is lost. The user of the motor vehicle may couple various mobile devices (mobile telephone, tablet, etc.) to his motor vehicle (for example via Bluetooth, WLAN, etc.). In this case, the motor vehicle uses the private key stored in its data memory to access the digital copy, and displays this digital copy on the mobile devices. It is only possible to display the digital copy if one is in possession of the motor vehicle. If the vehicle is sold, the digital copy is no longer available. Using the vehicle identification number, any outsider is able to recognize which vehicle and therefore which value is stored in the blockchain. Motor vehicle collections are thereby able to be digitized, wherein the authenticity of the digital copies of these motor vehicles is verified by the blockchain.

What is claimed is:

1. A method for generating and storing a digital copy of a motor vehicle, comprising:
   generating a private key;
   storing the private key in a data memory of the motor vehicle;
   generating the digital copy of the motor vehicle;
   storing the digital copy of the motor vehicle in a blockchain by way of the private key;
   producing a data connection between the motor vehicle and a viewing means;
   loading the digital copy from the blockchain into the data memory of the motor vehicle using the private key;
   transferring the digital copy from the data memory of the motor vehicle to a further data memory of the viewing means by way of the data connection; and
   viewing the digital copy stored in the further data memory on the viewing means.

2. The method as claimed in claim 1, further comprising:
   generating a vehicle identification number; and
   assigning the vehicle identification number to the motor vehicle and to the digital copy.

3. The method as claimed in claim 2, wherein a memory address is generated on the basis of the vehicle identification number and the blockchain is stored in a memory space that is referenced by the memory address.

4. The method as claimed in claim 1, wherein the private key is generated at a time during manufacture of the motor vehicle.

5. The method as claimed in claim 4, wherein the private key is generated on the basis of motor vehicle data present at the time.

6. The method as claimed in claim 1, wherein direct reading of the private key by a user of the motor vehicle is prevented.

7. The method as claimed in claim 1, wherein the motor vehicle functions as an inaccessible private key.

* * * * *